United States Patent [19]
Yuhasz et al.

[11] Patent Number: 4,737,609
[45] Date of Patent: Apr. 12, 1988

[54] PUSH BUTTON SWITCH

[75] Inventors: Stephen J. Yuhasz, Zionsville; David G. Luchaco, Macungie; Julian J. Raphael, East Stroudsburg; Ronald P. Frazer, East Greenville, all of Pa.

[73] Assignee: Lutron Electronics Co., Inc., Coopersburg, Pa.

[21] Appl. No.: 773,776

[22] Filed: Sep. 6, 1985

Related U.S. Application Data

[62] Division of Ser. No. 541,368, Oct. 13, 1983, Pat. No. 4,563,592.

[51] Int. Cl.$^4$ .............................................. H01H 3/20
[52] U.S. Cl. ...................................................... 200/330
[58] Field of Search ................ 174/16 HS, 53, 55, 56, 174/57, 66; 361/379, 387, 388, 389; 200/159 R, 304, 329, 330, 333, 339, 340

[56] References Cited

U.S. PATENT DOCUMENTS

| | | | |
|---|---|---|---|
| 2,794,890 | 6/1957 | Taylor | 200/330 |
| 3,058,020 | 10/1962 | Balan | 174/16 HS X |
| 3,348,014 | 10/1967 | Brown | 200/330 |
| 4,042,903 | 8/1977 | Finegan, Jr. | 174/16 HS |
| 4,068,289 | 1/1978 | Ferrigno | 174/16 HS X |
| 4,139,756 | 2/1979 | Tsen et al. | 200/330 |
| 4,359,619 | 11/1982 | Bergoltz | 174/66 X |

FOREIGN PATENT DOCUMENTS 1173158  7/1964  Fed. Rep. of Germany ...... 200/330

OTHER PUBLICATIONS

Touch-Plate® Electro-Systems, Inc; catalogs TP 526-74 and TP-701, 8 pp., 10-1977.

Primary Examiner—J. R. Scott
Attorney, Agent, or Firm—Ostrolenk, Faber, Gerb & Soffen

[57] ABSTRACT

An improved push button switch has a highly desirable tactile feel. The switch includes a face plate having a front surface, a rear surface and an opening extending from the front to the rear surface, the opening having a geometric center as viewed from a position in front of the face plate. A push button is located in the opening. A pair of leaf springs are provided for coupling the push button to the face plate with at least a portion of the push button being biased against the rear surface of the face plate. A normally open electro-mechanical switch having a stationary contact and a movable contact is provided. The movable contact is biased against a portion of the rear surface of the push button at a location corresponding to the geometric center of the opening in the face plate. The push button, the face plate, the leaf springs and the mechanical switch cooperate to ensure that whenever the operator of the push button switch depresses the push button at a first location which is removed from the geometric center of the opening, the push button will contact the stationary surface at a second location which is on the opposite side of the center of the opening relative to the first location, and thus provide a force to the moveable contact to close the push button switch.

27 Claims, 2 Drawing Sheets

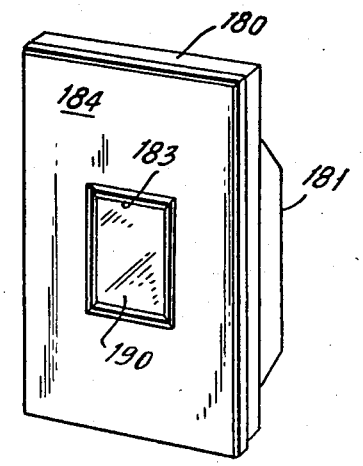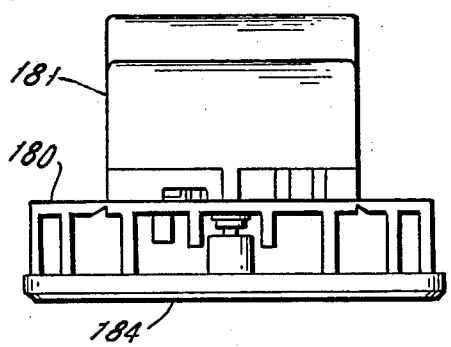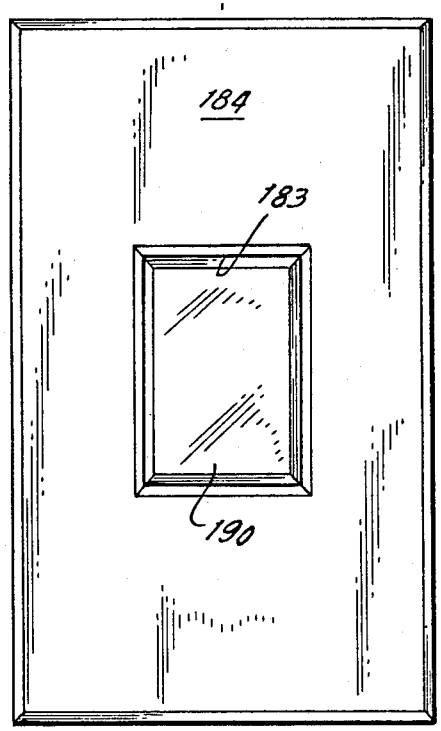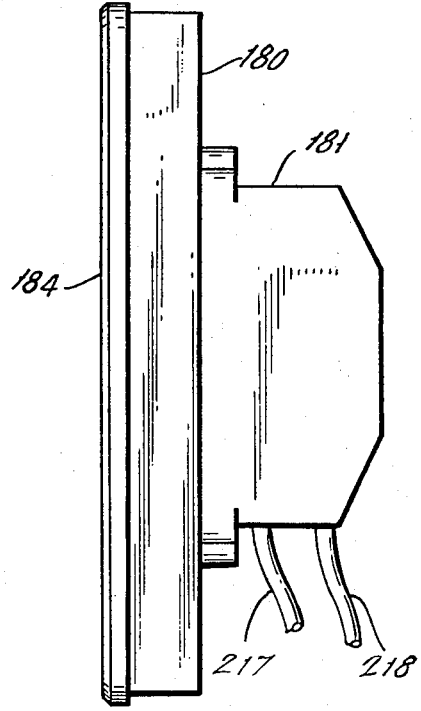

PUSH BUTTON SWITCH

RELATED APPLICATIONS

This is a division of application Ser. No. 541,368, filed Oct. 13, 1983, U.S. Pat. No. 4,563,592, in the name of STEPHEN J. YUHASZ and DAVID G. LUCHACO for WALL BOX DIMMER WITH PLURAL REMOTE SWITCHES.

BACKGROUND OF THE INVENTION

The present invention is directed towards an improved push button switch, and more specifically to an improved push button switch with a highly desirable tactile feel.

Prior art push button switches normally include a mechanical switch having a stationary and a moveable contact and a push button connected to the movable contact. The movable contact is ordinarily biased into a normally open position and is closed when the operator of the push button switch depresses the push button and thereby moves the movable contact into the closed position.

The push button switch of the present invention is particularly useful in connection with a load control system such as the wall box dimmer switching system disclosed in parent application Ser. No. 541,368 filed Oct. 13, 1983, now U.S. Pat. No. 4,563,592, the disclosure of which is incorporated herein by reference. The push button switch of the present invention is particularly useful as a remote control switching device for the dimmer switching of the foregoing disclosure.

It is highly desirable that push button switches of this type have a positive tactile feel wherein the operator of the switch unequivocally knows whether or not he has depressed the switch sufficiently to close the mechanical switch; that is, the switch should give the operator of the switch sufficient feedback to know whether or not he has closed the switch. This is especially important if the push button switch is located in a room which is remote from loads (e.g. lamps) being controlled.

To assure the operator of the switch that he has closed the electro-mechanical switch, it is also important the electro-mechanical switch closes properly irrespective of the specific location on the push button switch which is depressed by the operator of the push button switch.

BRIEF DESCRIPTION OF THE INVENTION

In order to achieve the foregoing and other desired results, the present invention is directed towards a push button switch, comprising:

a face plate having a front surface, a rear surface and an opening extending from said front to said rear surface, said opening having a geometric center as viewed from a position in front of said face plate;

a push button located in said opening;

first means for resiliently coupling said push button to said face plate with at least a portion of said push button being biased against a stationary surface which is located rearward of said front surface of said face plate and such that said push button can be moved rearwardly by the operator of said switch;

a normally open electro-mechanical switch having a stationary contact and a movable contact which is movable between an open and a closed position, and biased against a portion of said rear surface of said push button by second means, separate from said first means, said portion being located at approximately said geometric center of said opening;

said push button, said face plate, said coupling means and said electro-mechanical switch cooperating to ensure that whenever the operator of said push button switch depresses said push button at a first location which is removed from said geometric center of said opening, said push button will contact said stationary surface at a second location on the opposite side of said center of said opening relative to said first location.

The stationary surface is preferably the rear surface of the face plate and surrounds the entire periphery of the opening. The push button preferably has a recessed flange section which is biased into contact with the stationary surface by the coupling means. The coupling means comprises first and second resilient members which respectively contact said push button on opposite sides of said center of said opening.

The invention is also directed towards a push button switch, comprising:

a face plate having a front surface, a rear surface and an opening extending from said front to said rear surface, said opening having a geometric center as viewed from a position in front of said face plate;

a push button located in said opening;

means for resiliently coupling said push button to said face plate with at least a portion of said push button being biased against a stationary surface which is located rearward of said front surface of said face plate and such that said push button can be moved rearwardly by an operator of said switch;

a micro switch having a stationary contact and a movable contact, said moveable contact being moveable between an open and a closed position and biased against a portion of a rear surface of said push button, said portion being located at approximately said geometric center of said opening, said micro switch producing a mechanical shock upon closing of said stationary and moveable contacts thereby providing tactile feedback to the operator of said push button switch;

said push button, said face plate, said coupling means and said mechanical switch cooperating to ensure that whenever the operator of said push button switch depresses said push button at a first location which is removed from said geometric center of said opening, said push button will contact said stationary surface at a second location which is on the opposite side of said center of said opening relative to said first location.

In order to ensure that the push button is not depressed a distance which might injure the mechanical switch, at least a portion of a heat sink to which the face plate is coupled is located below the push button and limits the rearward movement of the push button.

BRIEF DESCRIPTION OF THE DRAWINGS

FIG. 1 is a perspective view of the front, top and side surfaces of a push button switch constructed in accordance with the present invention;

FIG. 2 is an elevational view of the front surface of the switch of FIG. 1.

FIG. 3 is a top view of FIG. 2.

FIG. 4 is a side view of FIG. 2.

DETAILED DESCRIPTION OF THE INVENTION

Figure 5:
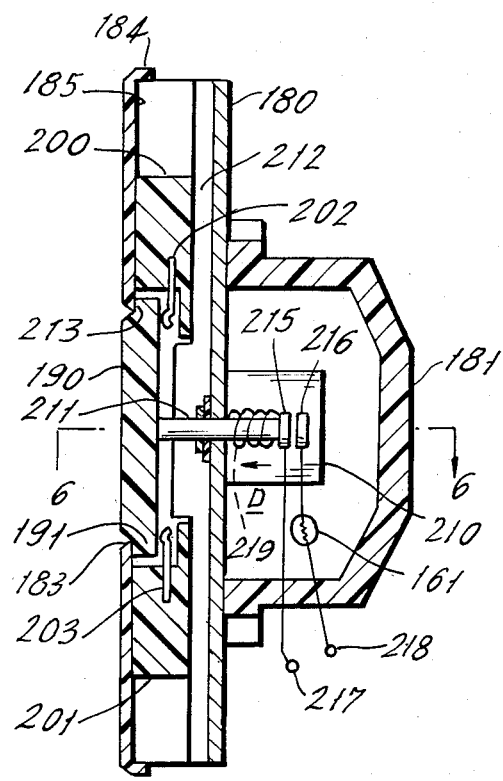
FIG. 5 is a cross-sectional view of FIG. 2 taken across the section line 5—5 in FIG. 2.

Referring now to the drawings wherein like numerals indicate like elements, there is shown in FIGS. 1–6 a push button switch constructed in accordance with the principles of the present invention. The switch preferably takes the form of a wall-mounted switch which can be mounted to a standard switch wall box. The overall appearance of the switch is very similar to the appearance of a slide dimmer switch shown in U.S. Pat. No. 3,746,923 dated July 17, 1973 with the exception that the dimmer slider has been replaced with a push button 190. Slide dimmers of the foregoing type utilize a triac or similar controllable conductive device and thereby require the use of a heat sink to dissipate the heat created by the triac. While a heat sink of this type is not required for the simple push button switch of the present invention, the presently preferred embodiment incorporates such a heat sink 180 in order to ensure a similar appearance to the slide dimmer and to make it possible to utilize as much common inventory as possible.

A face plate 184 is releasably coupled to the front surface of the head sink 180 whose rear surface supports an insulation housing 181 which preferably houses the stationary and movable contacts 216, 215 of the mechanical switch forming part of the push button switch.

Figure 6:
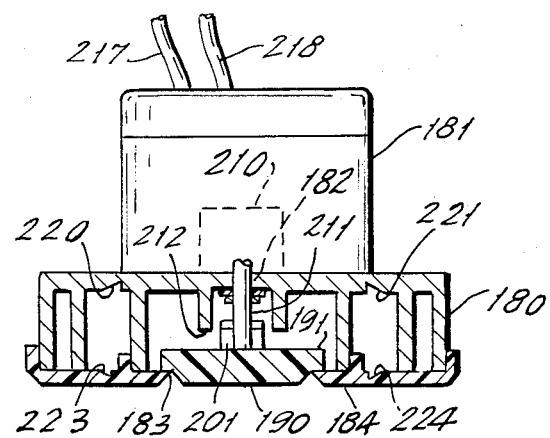
FIG. 6 is a cross-sectional view of FIG. 5 taken across the section line 6—6 in FIG. 5.

An opening 183 is formed in the face plate and receives the push button 190 which effectively closes the opening. As best shown in FIGS. 5 and 6, the push button 190 is provided with an enlarged annular flange 191 which abuts against the interior of opening 183 to hold the outer surface of push button 190 flush with the outer surface of plate 184.

Two insulation support members 200 and 201 are appropriately secured to the inside surface of plate 184 as by cementing. Members 200 and 201 have leaf-spring members 202 and 203, respectively, secured therein which leaf springs press against the right-hand surface of push button 190 as viewed in FIG. 5 to force flange 191 toward contact with the opposing interior surface 185 of plate 184. Thus, push button 190 is secured in position and fits closely within the opening 183 but can be depressed against the biasing force of springs 202 and 203.

Also note that annular flange 191 is relatively thick and dimensioned such that its rear surface will come into contact with the raised top section of fins 212 if sufficient force is applied to button 190. By properly dimensioning the thickness of button 190 and flange 191 as well as the height of fins 212 of the heat sink 180, the switching device 210 (described below) will be protected from damage due to overtravel beyond its mechanical limit, since the button travel is forcibly stopped when the rear surface of button 190 comes into contact with fins 212. Even extremely high force levels on button 190 can easily be absorbed at this relatively large interface, and switching device 210 is thereby protected from abuse.

As best shown in FIGS. 5 and 6, the switching device 210 is contained within the insulation housing 181, and can be a conventional microswitch which has a projecting plunger 211, the plunger projecting from the housing through an opening 182 in the heat sink 180. The plunger 211 is conventionally biased toward the button 190 (in the direction shown as D in FIG. 5) by resilient means within the device 210, these resilient means being shown schematically at 219 in FIG. 5. The depression of the plunger 211 causes the internal contacts, schematically shown in FIG. 5 as contacts 215 and 216, to engage one another. This engagement takes place with relatively little axial motion of the plunger 211 (less than about 1 millimeter) and is accomplished with relatively small actuating force (of the order of several ounces). The contacts 215 and 216 are then connected to the leads 217 and 218 (FIG. 5) which are taken through the insulation housing 181. These leads are preferably coupled to a control circuit such as that described in parent application Ser. No. 541,368, now U.S. Pat. No. 4,563,592, to control one or more load devices. Note that in FIG. 5 there is also schematically illustrated a positive temperature coefficient resistor 161 which is contained within the housing 181 and which protects the mechanical switch comprising contacts 215, 216 from high currents which might result from wiring errors.

As a result of the novel structure shown in FIGS. 1 to 6, the remote switch can be operated by the depression of the relatively large area push-button switch operator 190. The push button in the preferred embodiment is about 1 inch in width by 1½ inches in height. It engages the plunger 211 at its center. Because of the short actuating motion needed for the plunger 211 in order to close contacts 215 and 216, an operator can press the push button 190 at any point on its exposed surface area to obtain the necessarily axial movement of plunger 211 to cause operation of the remote switch device. That is, even though the push button 190 may attempt to rotate or tilt during operation, its center will still move sufficiently to operate the plunger 211 to contact-closed position.

As a result of the foregoing, whenever the operator of the switch depresses a portion of push button 190 which is located off center from plunger 211, a portion of the front surface 213 of the flange 191 (FIG. 5) which surrounds the periphery of push button 190 contacts the rear surface 185 of the face plate 184 at a location located on the opposite side of the plunger 211 from the point where the operator contacted the push button 190.

Also note that the button and face plate are parts of a single subassembly, so that the face plate may be removed, as for assembly or installation purposes, and the button remains attached to the face plate, so that reassembly is very simple. Also, this reduces tolerance problems between the button and face plate location. Further, this design allows the use of a button which does not protrude above the surface of the face plate, enhancing the aesthetic appeal of the design.

It will be noted particularly in FIG. 6 that the heat sink 180 can be reduced in width by breaking it off at notches 220 and 221, for example, for gang-mounting purposes. Either one or both sides can be broken off. With both sides intact, the switch width will be about 2¾ inches and its height will be about 4½ inches. When one side is broken off, the switch width is reduced to 2¼ inches and when both sides are broken off the switch width is reduced to 1¾ inches. The plastic face plate 184 is also provided with similar break-off notches 223 and 224, respectively, which enables a reduction in the width of the face plate 184 by the same amount as the underlying heat sink.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. An improved push-buttom switch, comprising:
   a face plate having a front surface, a rear surface and an opening extending from said front surface to said rear surface, said opening having a geometric center as viewed from a position in front of said face plate;
   a push button located in said opening;
   first resilient means for resiliently coupling said push button to said face plate so that at least a portion of said push button is biased against a stationary surface of said face plate in a rest position, said surface being located rearward of said front surface of said face plate, said first resilient means allowing said push button to be moved rearwardly into multiple reararrd positions by an operator of said switch;
   a normally open mechanical switch having a stationary contact and a movable contact, said movable contact being movable between an open position and a closed position and said movable contact being biased in a direction toward a portion of a rear surface of said push button by second resilient means, said second resilient means being separate from said first resilient means, said portion of said push button toward which said movable contact is biased being located at approximately said geometric center of said opening;
   said push button, said face plate, said coupling means and said mechanical switch cooperating to ensure that whenever the operator of said push button switch depresses said push button at a first location which is removed from said geometric center of said opening, said push button will be moved into one of said multiple rearward positions and will contact said stationary surface at a second location which is on the opposite side of said center of said opening relative to said first location, and said movable contact will be moved into said closed position, regardless of which of said multiple rearward positions said push button is in;
   said switch further comprising a heat sink having a plurality of fins, said face plate and said mechanical switch being mounted on said heat sink, at least one of said fins limiting the movement of said push button toward the mechanical switch in a manner which protects said mechanical switch.

2. The improved push button switch of claim 1, wherein said stationary surface surrounds the entire said opening.

3. The improved push button switch of claim 1, wherein said stationary surface forms part of said rear surface of said face plate.

4. The improved push button switch of claim 2, wherein said stationary surface forms part of said rear surface of said face plate.

5. The improved push button switch of claim 4, wherein said push button has a flange section which is biased into contact with said stationary surface by said first resilient means.

6. The improved push button switch of claim 3, wherein said push button has a flange section which is biased into contact with said stationary surface by said first resilient means.

7. The improved push button switch of claim 2, wherein said push button has a flange section which is biased into, contact with said stationary surface by said first resilient means.

8. The improved push button switch of claim 1, wherein said push button has a flange section which is biased into with said stationary surface by said first resilient means.

9. The improved push button switch of claim 1, wherein said first resilient first and second resilient members located on opposite sides of said geometric center, respectively.

10. The improved push button switch of claim 9, wherein said resilient members are leaf springs.

11. The improved push button switch of claim 1, wherein said mechanical switch is a micro switch.

12. The improved push button switch of claim 1, wherein an operating member of said mechanical switch extends through an opening in said heat sink.

13. The improved push button switch of claim 1, wherein said opening in said face plate is rectangular in shape as viewed from a position in front of said front surface of said face plate.

14. An improved push-button switch, comprising:
    a face plate having a front surface, a rear surface and an opening extending from said front surface to said rear surface, said opening having a geometric center as viewed from a position in front of said face plate;
    a push button located in said opening and effectively covering said opening;
    coupling means for resiliently coupling said push button to said face plate so that at least a portion of said push button is biased against a stationary surface of said face plate in a rest position said surface being located rearward of said front surface of said face plate, said coupling means allowing said push button to be moved rearwardly into multiple rearward positions by an operator of said switch;
    a micro switch having a stationary contact and a movable contact, said movable contact being movable between an open position and a closed position and biased in a direction toward a portion of a rear surface of said push button, said portion being located at approximately said geometric center of said opening, said micro switch producing a mechanical shock upon closing of said stationary and movable contacts thereby providing tactile feedback to the operator of said push button switch;
    said push button, said face plate, said coupling means and said mechanical switch cooperating to ensure that whenever the operator of said push button switch depresses said push button at a first location which is removed from sid geometric center of said opening, said push button will be moved into one of said multiple rearward positions and will contact said stationary surface at a second location which is on the opposite side of said center of said opening relative to said first location, and said movable contact will be moved into said closed position, regardless of which of said multiple rearward positions said push button is in.

15. The improved push button switch of claim 14, wherein said stationary surface surrounds the entirety of said opening.

16. The improved push button switch of claim 14, wherein said stationary surface forms part of said rear surface of said face plate.

17. The improved push button switch of claim 15, wherein said stationary surface forms part of said rear surface of said face plate.

18. The improved push button switch of claim 17, wherein said push button has a flange section which is biased into contact with said stationary surface by said coupling means.

19. The improved push button switch of claim 16, wherein said push button has a flange section which is biased into contact with said stationary surface by said coupling means.

20. The improved push button switch of claim 15, wherein said push button has a flange section which is biased into contact with said stationary surface by said coupling means.

21. The improved push button switch of claim 14, wherein said push button has a flange section which is biased into contact with said stationary surface by said coupling means.

22. The improved push button switch of claim 14, wherein said coupling means includes first and second resilient members located on opposite sides of said geometric center, respectively.

23. The improved push button switch of claim 22, wherein said resilient members are leaf springs.

24. The improved push button switch of claim 14, further comprising a heat sink having a plurality of fins, said face plate being mounted on said heat sink and said micro switch being mounted on said heat sink.

25. The improved push button switch of claim 24, wherein at least one of said fins limits the motion of said push button in a manner which protects said micro switch.

26. The improved push button switch of claim 25, wherein an operating member of said micro switch extends through an opening in said heat sink.

27. The improved push button switch of claim 14, wherein said opening is rectangular in shape as viewed from a position in front of said front surface of said face plate.

* * * * *